(12) United States Patent
Sheng

(10) Patent No.: US 10,846,823 B2
(45) Date of Patent: *Nov. 24, 2020

(54) IMAGE PROCESSING METHOD, APPARATUS AND MACHINE-READABLE MEDIA

(71) Applicant: Alibaba Group Holding Limited, Grand Cayman (KY)

(72) Inventor: Xiaojie Sheng, Shanghai (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/738,973

(22) Filed: Jan. 9, 2020

(65) Prior Publication Data
US 2020/0143515 A1 May 7, 2020

Related U.S. Application Data

(63) Continuation of application No. 15/897,095, filed on Feb. 14, 2018, now Pat. No. 10,565,683.

(30) Foreign Application Priority Data

Feb. 15, 2017 (CN) .......................... 2017 1 0081731

(51) Int. Cl.
*G06T 3/40* (2006.01)
*H04N 19/117* (2014.01)
(Continued)

(52) U.S. Cl.
CPC .............. *G06T 3/4038* (2013.01); *G06T 7/33* (2017.01); *G06T 7/536* (2017.01); *H04N 19/117* (2014.11);
(Continued)

(58) Field of Classification Search
CPC ......... G06T 3/4038; G06T 2207/10016; G06T 7/536; H04N 19/117
See application file for complete search history.

(56) References Cited

U.S. PATENT DOCUMENTS 10,565,683 B2 * 2/2020 Sheng ...................... G06T 7/536
2011/0141225 A1 6/2011 Stec et al.
(Continued)

OTHER PUBLICATIONS

Office Action for U.S. Appl. No. 15/897,095, dated Jul. 15, 2019, Sheng, "Image Processing Method, Apparatus and Machine-Readable Media", 6 pages.
(Continued)

*Primary Examiner* — Leon Flores
(74) *Attorney, Agent, or Firm* — Lee & Hayes, P.C.

(57) ABSTRACT

Embodiments of the present application provide a method and an apparatus, and a machine readable media for image processing. The method includes obtaining a panoramic video image, where the panoramic video image is determined based on a perspective mapping, and the panoramic video image includes a primary perspective region and at least one secondary perspective region; dividing the secondary perspective region into at least two sub-regions based on distribution information of high-frequency components in the secondary perspective region; determining respective filter templates of the sub-regions, and filtering the sub-regions using the respective filter templates; and determining a filtered panoramic video image.

20 Claims, 13 Drawing Sheets

(51) Int. Cl.
    *G06T 7/536*     (2017.01)
    *G06T 7/33*     (2017.01)
    *H04N 19/174*     (2014.01)
    *H04N 19/132*     (2014.01)
    *H04N 19/18*     (2014.01)
    *H04N 19/136*     (2014.01)

(52) U.S. Cl.
    CPC ......... *H04N 19/132* (2014.11); *H04N 19/136* (2014.11); *H04N 19/174* (2014.11); *H04N 19/18* (2014.11); *G06T 2200/32* (2013.01); *G06T 2207/10016* (2013.01)

(56) References Cited

U.S. PATENT DOCUMENTS

| | | |
|---|---|---|
| 2015/0054913 A1 | 2/2015 | Annau et al. |
| 2016/0028950 A1 | 1/2016 | Perazzi et al. |
| 2018/0012335 A1 | 1/2018 | Adsumilli et al. |
| 2018/0040164 A1 | 2/2018 | Newman et al. |
| 2018/0232856 A1 | 8/2018 | Sheng |

OTHER PUBLICATIONS

The PCT Search Report and Written Opinion dated Apr. 25, 2018, for PCT Application No. PCT/US18/18254, 9 pages.

\* cited by examiner

| | | | | |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |

FIG. 7C

IMAGE PROCESSING METHOD, APPARATUS AND MACHINE-READABLE MEDIA

CROSS REFERENCE TO RELATED PATENT APPLICATIONS

This application is a continuation of U.S. patent application Ser. No. 15/897,095, filed Feb. 14, 2018, which claims foreign priority to Chinese Patent Application No. 201710081731.7, filed on Feb. 15, 2017, entitled "Image Processing Method, Apparatus and Machine-Readable Media," which are hereby incorporated by reference in their entirety.

TECHNICAL FIELD

The present application relates to the field of image processing technologies.

BACKGROUND

A 360-degree panoramic video displays a very broad range that can cover an entire perspective of a user, thus generally having a much higher resolution than that of a regular planar video. The 360-degree panoramic video can be encoded and compressed after being mapped, to achieve a balance between the rate of compression and the smoothness of transmission.

At present, a 360-degree panoramic video can be mapped in various approaches to determine mapped panoramic video images. Some of the approaches are regional mapping, where regions having high mapping pixel values have high resolutions, and regions having low mapping pixel values have low resolutions. However, when model reconstruction and image rendering are performed using a user terminal, regions having low resolutions correspondingly have more high-frequency components of a mapped image as low pixel values are obtained through mapping.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present application provide a method, an apparatus, and a machine-readable media of image processing. The method includes obtaining a panoramic video image, wherein the panoramic video image is determined based on perspective mapping, and the panoramic video image includes a primary perspective region and at least one secondary perspective region; dividing the secondary perspective region into at least two sub-regions based on distribution information of high-frequency components in the secondary perspective region; determining respective filter templates of the sub-regions, and filtering the sub-regions using the respective filter templates; and determining a filtered panoramic video image.

BRIEF DESCRIPTION OF THE DRAWINGS

FIG. 7A, FIG. 7B and FIG. 7C are schematic diagrams illustrating filter templates according to an embodiment of the present application.

DETAILED DESCRIPTION

Figure 1:
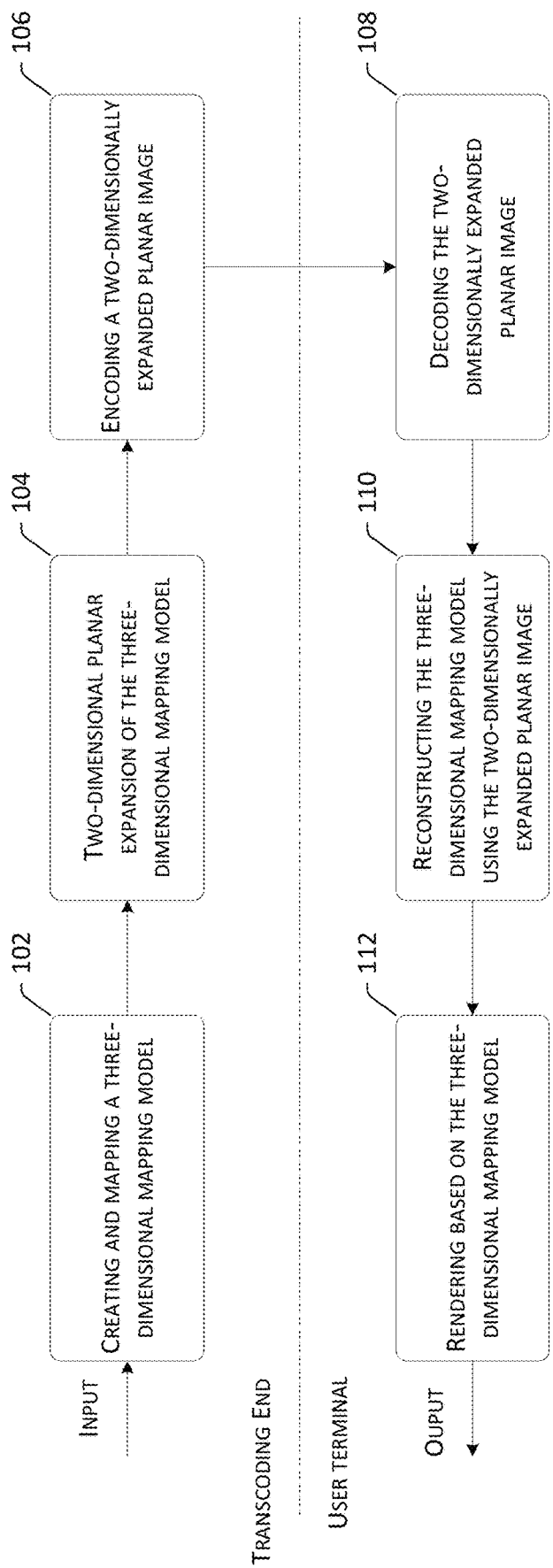
FIG. 1 is a schematic diagram illustrating a panoramic video at a transcoding end and a user terminal.

To make the above objectives, features and advantages of the present application more comprehensible, the present application is described in further detail hereinafter in conjunction with accompanying drawings and specific implementations.

The concept of the present application is easy to be modified and replaced in a variety of different manners. Specific embodiments have been shown through the accompanying drawings and will be described in detail herein. However, it should be understood that the above content is not intended to limit the concept of the present application to specific forms that are disclosed. In contrast, the specification and the appended claims of the present application are intended to cover all forms of modifications, equivalents and replacements.

In the present specification, "one embodiment", "an embodiment", and "a specific embodiment", for example, represent that the described embodiment can include a specific feature, structure or characteristic. However, each embodiment may include or may not necessarily include the specific feature, structure or characteristic. Moreover, such phrases do not necessarily refer to a same embodiment. In addition, when a specific feature, structure, or characteristic is described with respect to an embodiment, the feature, structure, or characteristic can also be considered to be related to other embodiments within the scope known by one skilled in the art, whether it is specified or not. Furthermore, it should be understood that, items in a list included by a form "at least one of A, B, and C" can include the following possible items: (A); (B); (C); (A and B); (A and C); (B and C); or (A, B, and C). Likewise, items listed in a form "at least one in A, B, or C" may mean (A); (B); (C); (A and B); (A and C); (B and C); or (A, B, and C).

Under some circumstances, the disclosed embodiments can be implemented as hardware, firmware, software, or any combination thereof. The disclosed embodiments can also be implemented as instructions included or stored in one or more transitory or non-transitory machine-readable (e.g., computer-readable) storage media, and the instructions can be executed by one or more processors. The machine-readable storage media can be implemented as a storage device, a mechanism, or another physical structure (for example, a volatile or non-volatile memory, a media disk, other media, or devices of other physical structures) that stores or transmits information in a form that is readable by a machine.

In the accompanying drawings, some structures or method features can be displayed in specific arrangements and/or orders. However, preferably, these specific arrangements and/or orders are not essential. In contrast, in some implementations, such features can be arranged in different manners and/or orders, rather than the ones that are shown in the accompanying drawings. Moreover, content included in a structure or method feature in a specific accompanying drawing does not imply that the feature is necessary in all embodiments. In addition, these features may not be included in some implementations, or these features may be integrated with other features.

A panoramic image generally refers to a shot image that meets a normal effective perspective of human eyes (approximately 90 degrees horizontally and 70 degrees vertically) or includes peripheral perspective of the eyes (approximately 180 degrees horizontally and 90 degrees vertically) or even in a 360-degree complete scene range. A 360-degree panoramic video displays a very broad range that can cover an entire perspective of a user. Therefore, the 360-degree panoramic video is a hot-spot service in the field of Virtual Reality (VR), which can provide an immersive video viewing experience for users. FIG. 1 shows a flowchart of processing a panoramic video 100 at a transcoding end and a user terminal. The transcoding end creates 102 a three-dimensional mapping model and performs a mapping, performs an expansion 104 on a two-dimensional plane, and encodes 106 an expanded image. An encoded panoramic video image is sent to the user terminal. The user terminal can decode 108 the image, and then reconstruct 110 a same three-dimensional mapping model of the transcoding end based on the decoded image. Then, an output image is rendered 112 using the three-dimensional mapping model based on a real-time perspective of a user, so that the user can view the panoramic video. A device corresponding to the transcoding end may include, but is not limited to, a server, and other devices at a server end.

A device such as a server at the transcoding end may perform a mapping based on a three-dimensional model. Different models correspond to different ways of mapping. Some three-dimensional mapping models may perform a regional mapping based on a perspective. During a process of this type of mapping, the clearest image is provided for a primary perspective of the user. In other words, an image at this perspective has the highest resolution, and other perspectives are provided with lower resolution images. Specifically, a mapping resolution gradually decreases away from the primary perspective of the user, leading to regions that are far away from the primary perspective of the user to have an excessively small number of mapping pixel values, with an increase in corresponding high-frequency components of mapped images. As a result, portions of an panoramic video image that are away from the primary perspective of the user experience a severe zigzag effect in the image obtained by the user terminal through model reconstruction and rendering, thus causing poor visual experience of the user. High-frequency components are measurements for edges and profiles of an image, and form the edges and details of the image. In other words, high-frequency components are positions with dramatic changes in brightness or gray scale in an image that are reflected in a frequency domain.

Therefore, the embodiments of the present application use an adaptive filtering to reduce high-frequency image components generated in regions away from a primary perspective of a user after mapping, and thus alleviate the zigzag effect due to rendering of a user terminal.

Figure 2:
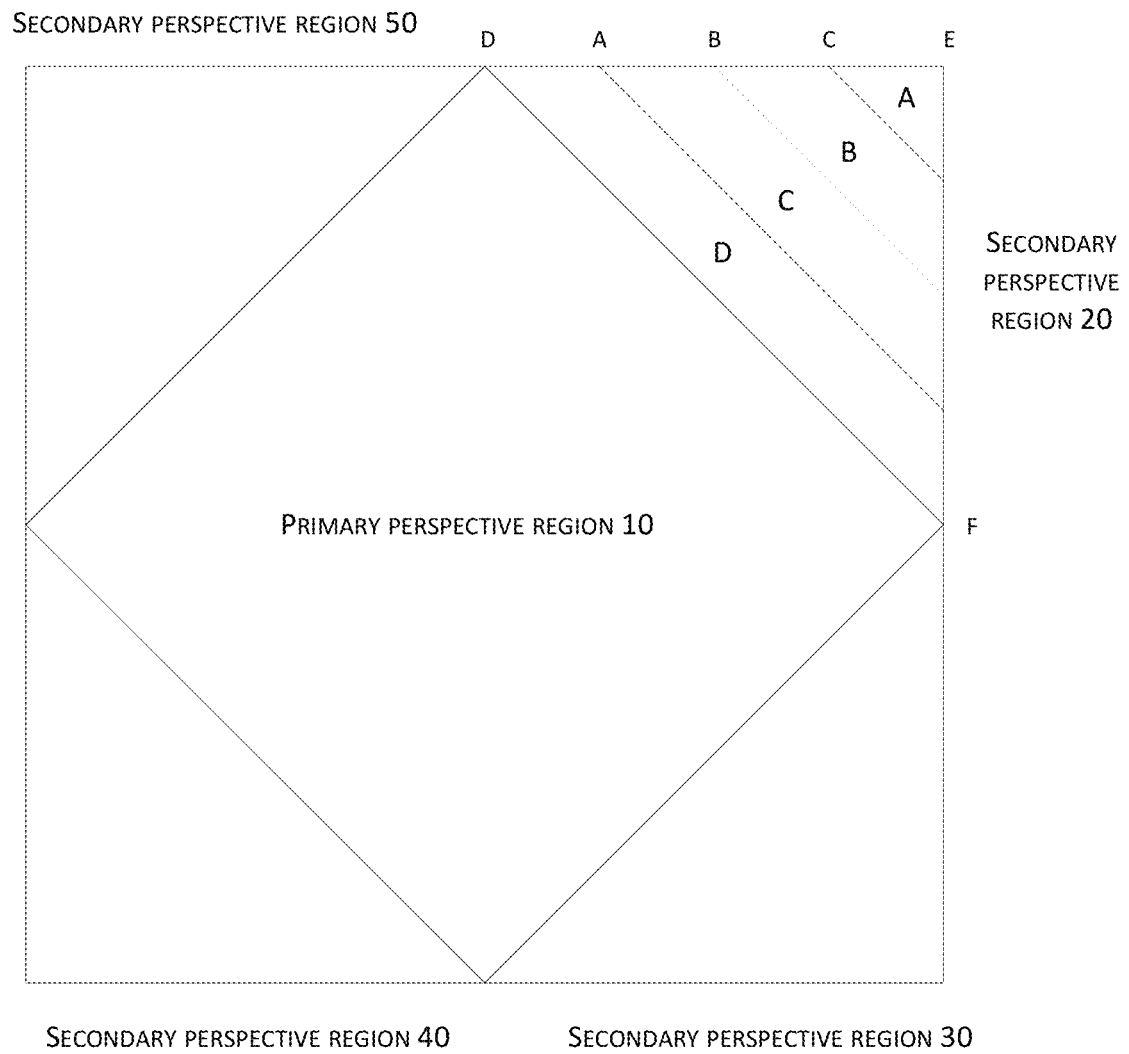
FIG. 2 is a schematic diagram illustrating regional filtering of an image according to an embodiment of the present application.

FIG. 2 is a schematic diagram of regional filtering of an image according to an embodiment of the present application.

FIG. 2 shows a panoramic video image (i.e., a two-dimensional planar expanded view) after the mapping. In the image, a rhombic region surrounded by 4 triangular regions is a primary perspective region 10, and the triangular regions are secondary perspective regions. In other words, the panoramic video image includes one primary perspective region 10 and four secondary perspective regions (i.e., 20-50). A device, such as a server, of a transcoding end filters each secondary perspective region, and divides the secondary perspective region into at least two sub-regions based on high-frequency components of the secondary perspective region. A secondary perspective region 20 is used as an example. Distribution of high-frequency components in the secondary perspective region 20 is determined, and three points a, b, and c are disposed at ¼, ½, and ¾ on a side de of the secondary perspective region 20 based on the distribution of the high-frequency components. Parallel lines with respect to a side df are made respectively at the three points a, b, and c, to divide the secondary perspective region into sub-regions A-D. Since each region has a different number of high-frequency components, different sub-regions need to be filtered differently. As a result, a filter template can be determined for each sub-region, and the sub-regions are filtered using corresponding filter templates. For example, a mean filtering is performed on a region A using a 5×5 template. A mean filtering is performed on a region B using a 3×3 template. A Gaussian filtering is performed on a region C using a 3×3 template. No filtering is performed on a region D that has relatively fewer high-frequency components. Filtering with smoothing processing such as a median filtering can further be performed using other templates in actual processing. An image including high-frequency components can be smoothed through a regional filtering, and a filtered panoramic video image can be determined, thus preventing a zigzag effect during rendering of a user terminal, and improving the visual experience of a user.

A perspective is generally a range that can be seen by human eyes. In the embodiments of the present application, respective ranges of a primary perspective and a secondary perspective are configured based on actual requirements, for example, determined based on parameters of a server end and/or a user terminal. For example, a perspective range of a user terminal (e.g., a VR device) is 45°. A primary perspective region is thus a region within a range of 45°, and other regions are secondary perspective regions. A filter template is a template used by filtering. The embodiments of the present application perform smoothing filtering using a filter template. The smoothness of a filter template is determined based on the size and the strength of the filter template. The size and the strength can be determined as needed. For example, the size can be 3×3 or 5×5, and the strength is determined based on a coefficient of the filter template.

The embodiments of the present application provide an image processing apparatus 300, which is applied in a device such as a server, corresponding to a transcoding end.

Figure 3:
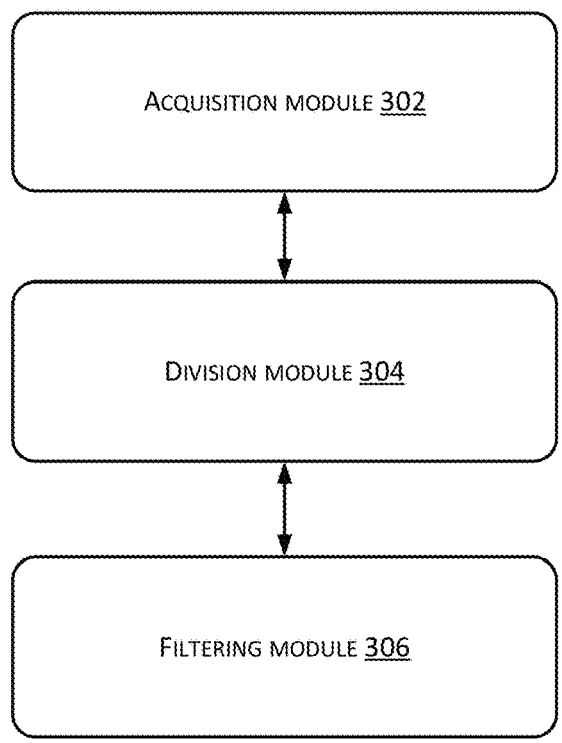
FIG. 3 is a structural block diagram illustrating an image processing apparatus according to an embodiment of the present application.

FIG. 3 shows a structural block diagram of an image processing apparatus 300 according to an embodiment of the present application, which can include the following modules.

An acquisition module 302 is configured to obtain a panoramic video image, wherein the panoramic video image is determined based on a perspective mapping, and the panoramic video image includes a primary perspective region and at least one secondary perspective region.

A division module 304 is configured to divide the secondary perspective region into at least two sub-regions based on distribution information of high-frequency components in the secondary perspective region.

A filtering module 306 is configured to determine respective filter templates of the sub-regions, filter the sub-regions using the respective filter templates, and determine a filtered panoramic video image.

The apparatus 300 creates a three-dimensional mapping model based on a perspective mapping, where the perspective can refer to an angle formed between a line of sight and a vertical direction of a display device such as a display. Therefore, the apparatus can use the three-dimensional mapping model to perform an image mapping and two-dimensional expanding to obtain a panoramic video image. Specifically, the panoramic video image is determined based on a perspective mapping, and therefore the panoramic video image includes a primary perspective region and at least one secondary perspective region.

The apparatus 300 can divide each secondary perspective region into at least two sub-regions based on high-frequency components of the respective secondary perspective region, e.g., according to the number of the high-frequency components in the region. The number of high-frequency components in one sub-region is greater than that of the other sub-region. Due to differences in the number of high-frequency components, the two sub-regions need to be filtered using different filter templates. A filter template for each sub-region can be determined, and smoothing filtering can be performed on corresponding sub-regions using respective filter templates. High-frequency components in the regions can be effectively smoothed through smoothing filtering, to obtain a filtered panoramic video image. The filtered panoramic video image can then be encoded and compressed, which is then transmitted to a user end.

In short, a panoramic video image including a primary perspective region and at least one secondary perspective region is obtained. The secondary perspective region is then divided into at least two sub-regions based on high-frequency components in the secondary perspective region. A regional processing is performed based on the high-frequency components. In other words, a filter template for each sub-region is determined, and the sub-regions are filtered using respective filter templates. Corresponding filtering is performed based on high-frequency components in different sub-regions, to smooth the high-frequency components in the corresponding sub-regions, thus preventing a zigzag effect during rendering at a user side, and improving the quality of an image without affecting normal viewing of the user.

The embodiments of the present application can be applied to various types of perspective-based model construction, mapping and expansion. An approach of Pyramid mapping and expanding is used as an example to describe processing on a panoramic video image after mapping and expansion.

Figure 4:
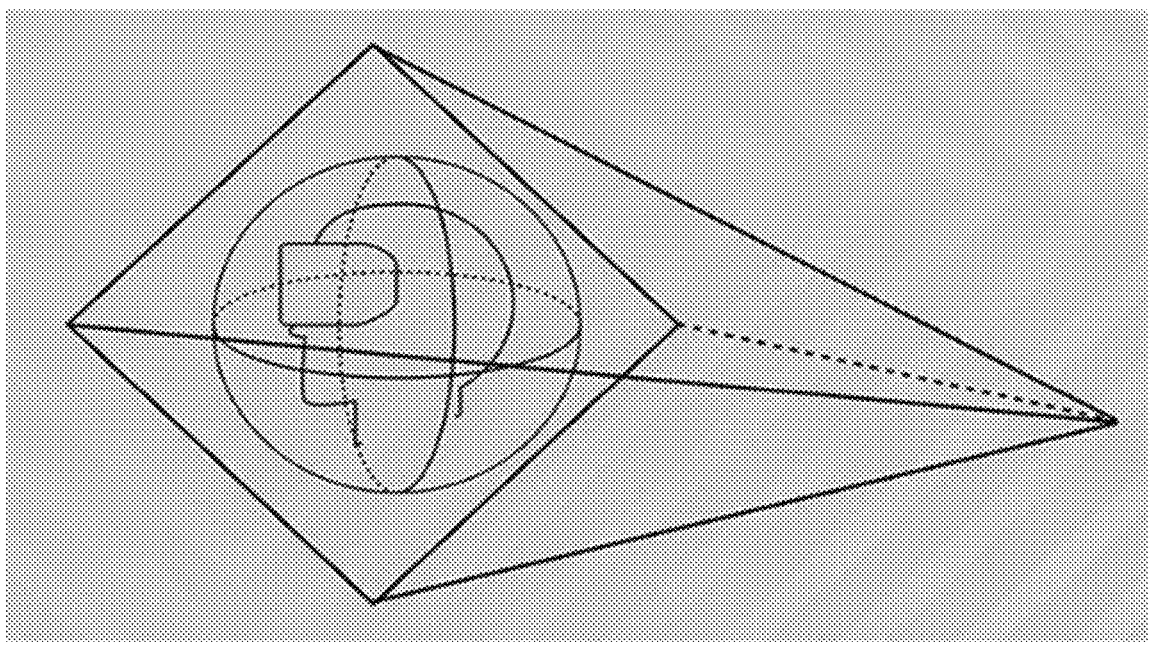
FIG. 4 is a schematic diagram illustrating principles of a Pyramid mapping according to an embodiment of the present application.
Figure 6:
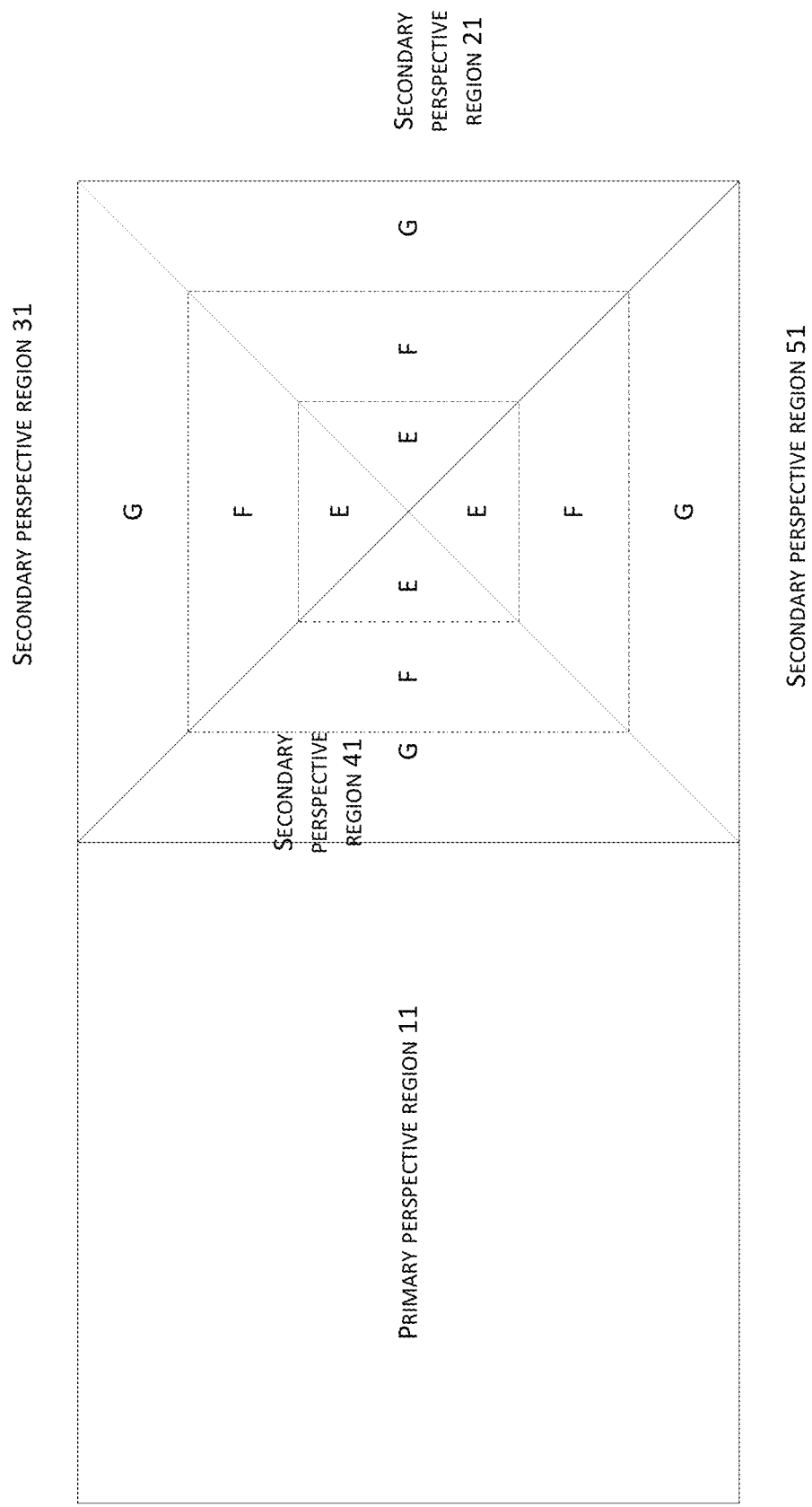
FIG. 6 is a schematic diagram illustrating another regional filtering of an image according to an embodiment of the present application.

The approach of Pyramid mapping and expansion uses different images mapped from different primary perspectives that are viewed by a user. In other words, each channel of a mapped image has the clearest resolution at a certain primary perspective of the user, and a mapping resolution decreases at positions away from the primary perspective of the user. Therefore, the approach of Pyramid mapping and expansion can obtain a mapped and expanded image with a lower resolution on each channel of mapped image. FIG. 4 is a schematic diagram of principles of Pyramid mapping. A Pyramid mapping model provides a high resolution at a portion with respect to a primary perspective of a user, and a mapping resolution gradually decreases at regions away from the primary perspective of the user. A vertex of a rectangular pyramid in the Pyramid mapping model represents a position that is the farthest away from a viewing perspective of the user. FIG. 2 shows a panoramic video image after mapping and expansion using a Pyramid mapping model. FIG. 6 shows an example of another panoramic video image after Pyramid mapping and two-dimensional expansion.

Although a Pyramid model can greatly reduce a resolution of a mapped image, the following problems in regions that are away from a primary perspective of the user occur because the resolution of the mapped image gradually decreases away from the primary perspective of the user. First, during a process of final rendering, sampling regions of high-frequency image mapping that are far away from the primary perspective of the user will cause a severe zigzag rendering effect. Second, an increase in the number of high-frequency components of the image will result in an increase in a bit rate required by compression, and a large portion of an encoding bit rate is consumed at high-frequency image regions that are far away from the primary perspective of the user, thus degrading the encoding quality of a primary perspective region and affecting the sharpness of the primary perspective region. Therefore, the embodiments of the present application can use an adaptive filtering to solve the problems of panoramic video transcoding technologies for Pyramid models and other adaptive resolution mapping having similar design ideas.

An adaptive filtering in the embodiments of the present application can perform different filtering processing regionally. Dividing the secondary perspective region into the at least two sub-regions based on the high-frequency components of the secondary perspective region may include determining distribution information of the high-frequency components in the secondary perspective region, and dividing the secondary perspective region into the at least two sub-regions based on the distribution information. In other words, if mapping resolutions of regions that are away from the primary perspective of the user are gradually reduced during mapping, the high-frequency components in the secondary perspective region are not evenly distributed. Therefore, the distribution information of the high-frequency components in the secondary perspective region can be determined, and the secondary perspective region can be divided into at least two sub-regions based on the distribution information, so that different filtering processing can be performed on different sub-regions. In actual processing, the secondary perspective region can be divided into sub-regions based on the distribution information according to the number of high-frequency components, a certain angle, or side(s) of the region, etc.

Figure 5:
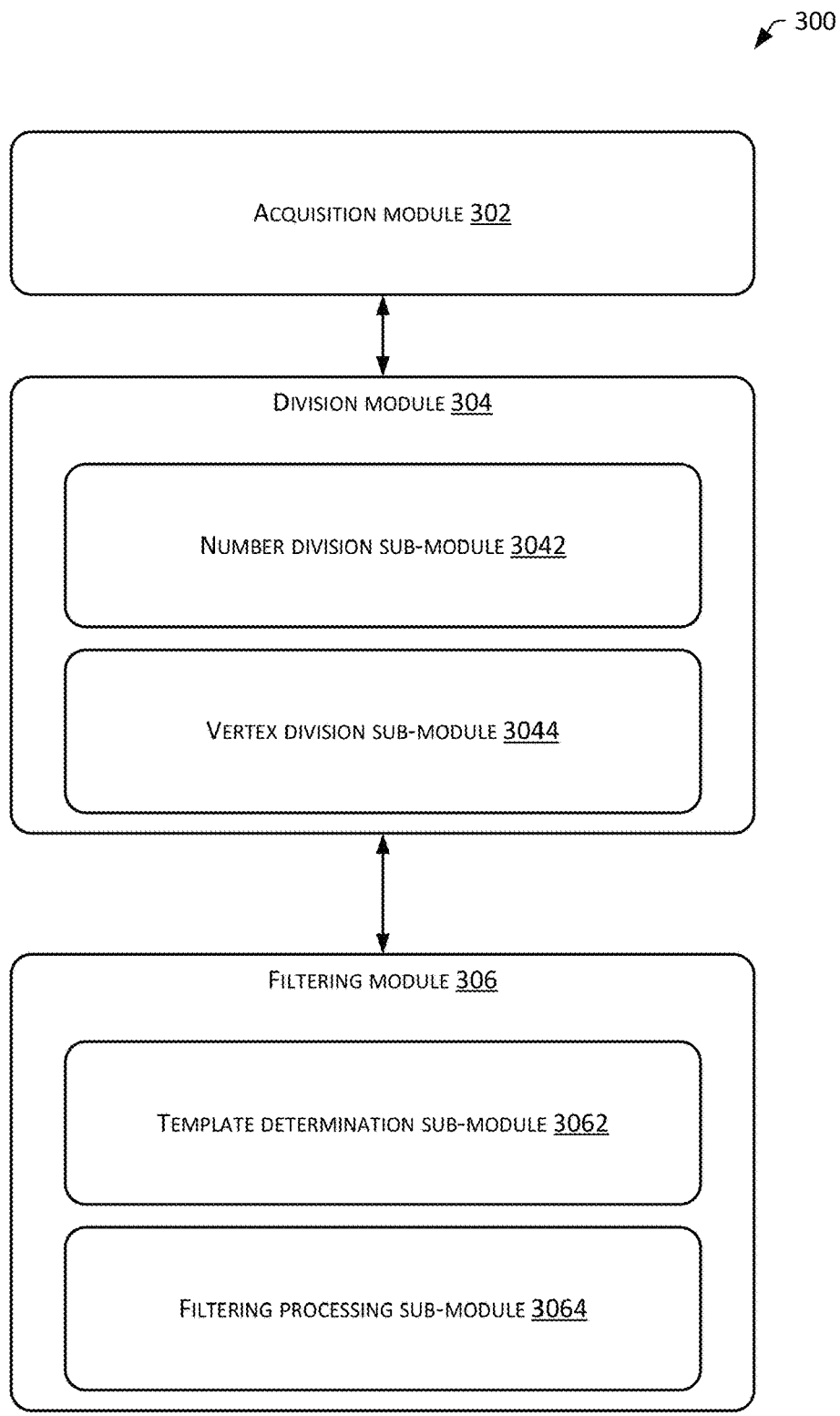
FIG. 5 is a structural block diagram illustrating another image processing apparatus according an embodiment of to the present application.

FIG. 5 shows a structural block diagram of another image processing apparatus 300 according to an embodiment of the present application, which can specifically include the following modules.

An acquisition module 302 is configured to obtain a panoramic video image determined based on a perspective mapping, where the panoramic video image includes a primary perspective region and at least one secondary perspective region. In an example, the acquisition module 302 of a device, such as a server, of a transcoding end obtains a panoramic video image determined based on a perspective mapping, and determines a primary perspective region and a secondary perspective region in the panoramic video image. FIG. 2 shows an example of a panoramic video image after Pyramid mapping and two-dimensional expansion, which includes a primary perspective region 10 and secondary perspective regions 20-50. FIG. 6 shows an example of another panoramic video image after Pyramid mapping and two-dimensional expansion, which includes a primary perspective region 11 and secondary perspective regions 21-51. A common vertex of the secondary perspective regions can be a vertex where a region in which the highest high-frequency component is located. Therefore, an example of this type of expansion can also combine the four secondary perspective regions into a single secondary perspective region.

A division module 304 is configured to divide the secondary perspective region into at least two sub-regions based on distribution information of high-frequency components in the secondary perspective region. During adaptive mapping, mapping sampling is gradually enhanced as a distance from the primary perspective of the user is increased. Therefore, the division module 304 can determine the distribution information of the high-frequency components in the secondary perspective region based on sampling rates during the mapping. In other words, the number of high-frequency components is higher in a region further away from a position of the primary perspective within the secondary perspective region. In contrast, the number of high-frequency components is lower in a region closer to the position of the primary perspective within the secondary perspective region. The division module 304 can determine the distribution information of the high-frequency components in the secondary perspective region, and divide the secondary perspective region into at least two sub-regions based on the distribution information.

The division module 304 includes a number division sub-module 3042 and a vertex division sub-module 3044.

In an example, the number division sub-module 3042 is configured to divide the secondary perspective region into at least two sub-regions based on the number of high-frequency components in the distribution information. After the distribution information of the high-frequency components in the secondary perspective region is determined, the number division sub-module 3042 can be configured to determine the number of high-frequency components in each positional region of the secondary perspective region based on the distribution information, and divide the secondary perspective region into at least two sub-regions based on the number of high-frequency components. For example, one or more thresholds can be set up, and a division into two or more sub-regions can be obtained based on a comparison between the thresholds and the number of high-frequency components in the region.

As shown in FIG. 6, the secondary perspective region can be divided into three sub-regions E, F, and G based on the number of high-frequency components in the secondary perspective region that is determined according to the distribution information, i.e., a distance from the primary perspective of the user. E is a sub-region that is farthest away from the primary perspective of the user, and G is a sub-region that is closest to the primary perspective of the user. For example, the number of high-frequency components can be set to N according to a manner of comparing the thresholds and the number, and the thresholds include T1 and T2, with T1>T2. As such, a sub-region where N>T1 is E, a sub-region where T1≥N>T2 is F, and a sub-region where N≥T2 is G.

In another example, the vertex division sub-module 3044 is configured to divide a side at which a target vertex in the secondary perspective region is located based on the distribution information, and divide the secondary perspective region into at least two sub-regions based on a division result, wherein the target vertex includes a vertex where a region having the highest high-frequency component is located. The target vertex includes a vertex where a region having the highest high-frequency component is located. For example, as shown in FIG. 2, a vertex in the four secondary perspective regions that does not overlap with the primary perspective region is the vertex where the region having the highest high-frequency component is located.

After the distribution information of the high-frequency components in the secondary perspective region is determined, the vertex division sub-module 3044 can perform a regional division based on the distribution information according to a certain angle or according to a side of the secondary perspective region. A resolution (i.e., the high-frequency components) in the secondary perspective region generally changes continuously and gradually. For example, the resolution in FIG. 2 decreases along a 45-degree direction, and therefore, the secondary perspective region can be divided into sub-regions based on the 45-degree direction. Alternatively, a side where the target vertex is located is divided based on a certain rule. A parallel line is made from an intersection obtained by division to an opposite side of the target vertex, and at least two sub-regions are determined based on the focus and the parallel line.

The filtering module 306 is configured to determine a filter template of each sub-region, and filter the sub-regions by using respective filter templates, and determine a filtered panoramic video image. The filtering module 306 includes a template determination sub-module 3062 and a filtering processing sub-module 3064.

The template determination sub-module 3062 is configured to determine the respective filter templates corresponding to the sub-region based on respective high-frequency components in the sub-regions. The larger the number of high-frequency components is, the greater the degree of smoothness of a filter template is. A degree of smoothness of a filter template is determined based on the size and the strength of the filter template, and the strength is determined based on a coefficient of the filter template. The degree of smoothness is determined based on the coefficient of the filter template when the sizes of two filter templates are the same. The sub-regions are obtained by division according to the number of high-frequency components. Correspondingly, different smoothing filtering processing needs to be performed on different sub-regions based on respective numbers of high-frequency components. The template determination sub-module 3062 can be configured to determine the respective filter templates corresponding to the sub-regions based on respective high-frequency components in the sub-regions. The larger the number of high-frequency components is, the greater the degree of smoothness of a filter template is. A degree of smoothness of a filter template is determined based on the size and the strength of the filter template, and the strength is determined based on a coefficient of the filter template. In other words, a sub-region having a larger number of high-frequency components uses a filter (i.e., a filter template) having a larger template size and a higher strength, thus achieving an effect of smoothing high-frequency components. When the sizes of two filter templates are the same, respective degrees of smoothness are determined based on respective coefficients of the filter templates.

The filtering processing sub-module 3064 is configured to use the filter templates to perform at least one of the following filtering processing on the sub-regions: a Gaussian filtering, a median filtering, and a mean filtering. After respective filter templates of the sub-regions are determined, the sub-regions are filtered based on the respective filter templates, where a smoothing filtering includes at least one of the following: a Gaussian filtering, a median filtering, and a mean filtering. Other low-pass filter templates such as linear or non-linear smoothing filtering methods, may also be used, which are not exhaustively listed in the present embodiment, and should not be construed as a limitation to the present application. Therefore, the filter templates can be used to perform at least one of the following filtering processing on the sub-regions obtained by dividing the secondary perspective region: a Gaussian filtering, a median filtering, and a mean filtering. Specifically, for the sub-regions that are obtained by dividing the secondary perspective region, different smoothing filtering processing can be performed by using templates having a same size based on respectively high-frequency components that are included. Alternatively, same or different smoothing filtering processing can be performed by using templates having different sizes. A filtered panoramic video image can be obtained by filtering. A corresponding category of filtering processing can be determined based on a coefficient of a filter template.

Figure 7A:
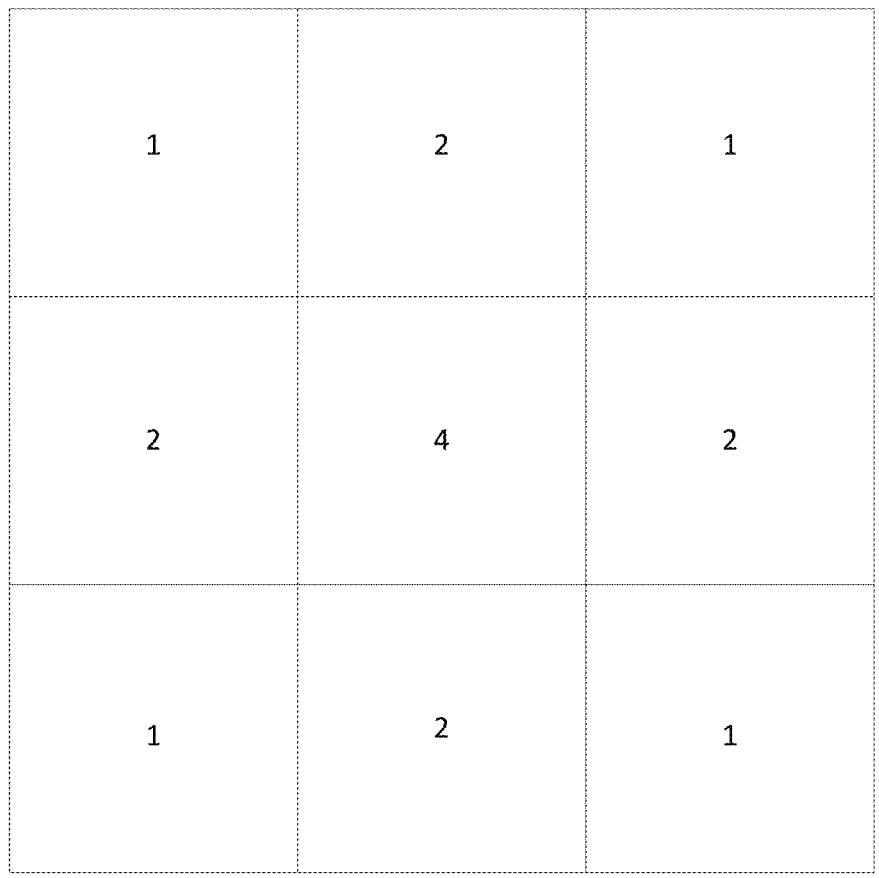
Figure 7B:
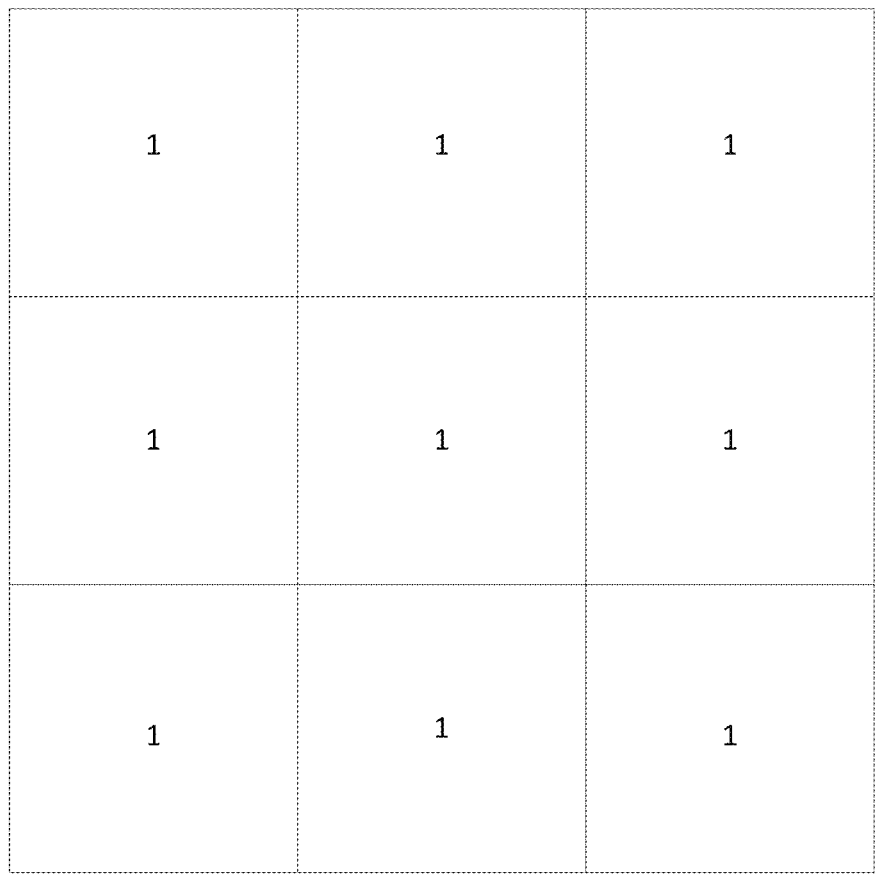
Figure 7C:
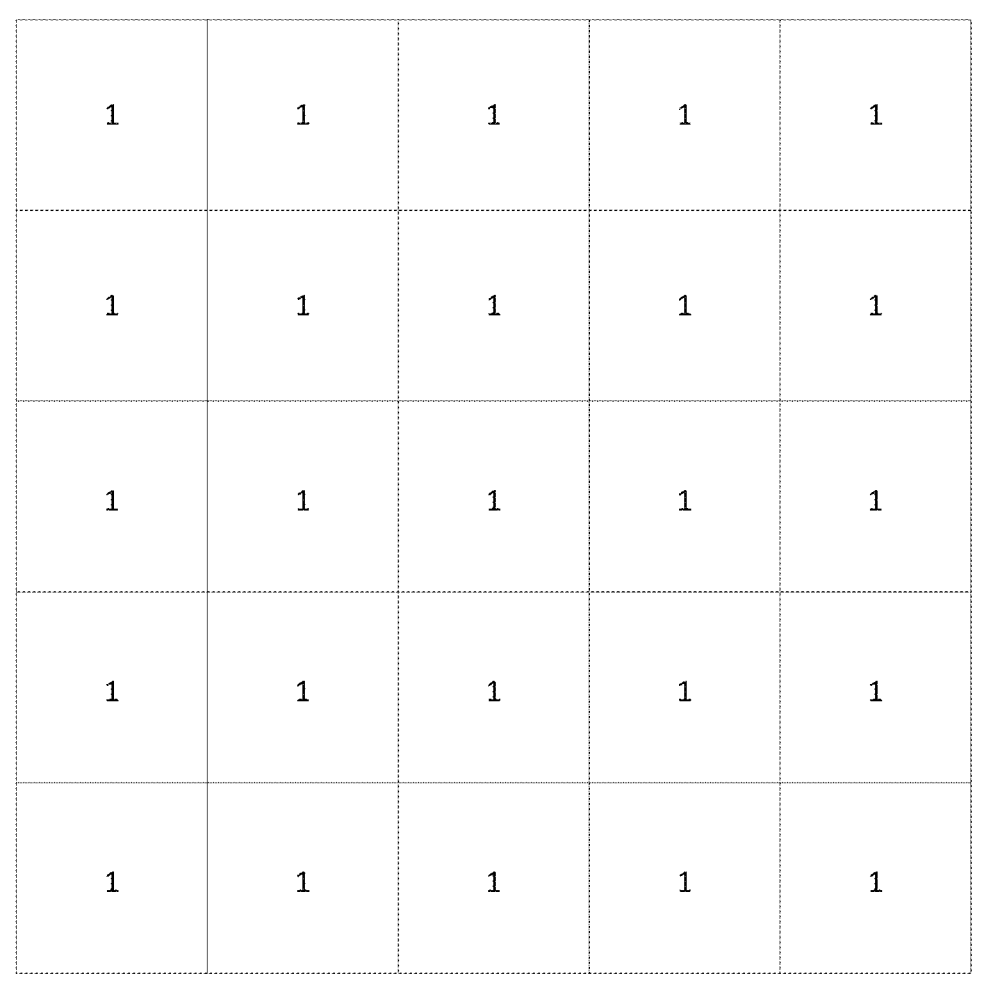

For example, besides the foregoing filtering approaches, filtering can be performed on the sub-regions of FIG. 2 using three different filter templates as shown in FIG. 7. A sub-region A can be filtered using a 5×5 mean filter template as shown in FIG. 7C, a sub-region B can be filtered using a 3×3 mean filter template as shown in FIG. 7B, a sub-region C can be filtered by using a 3×3 Gaussian filter template as shown in FIG. 7A, and filtering may not be performed on a sub-region D, thus performing an adaptive filtering processing on the secondary perspective region.

For another example, the sub-regions of FIG. 6 can be filtered using three different filter templates as shown in FIG. 7. FIG. 7A shows a 3×3 Gaussian filter template. FIG. 7B shows a 3×3 mean filter template. FIG. 7C shows a 5×5 mean filter template. Among the three templates, the mean filter template shown in FIG. 7C has the largest degree of smoothness, and the mean filter template shown in FIG. 7A has the smallest degree of smoothness. Therefore, a sub-region E can be filtered using the 5×5 mean filter template shown in FIG. 7C, a sub-region F can be filtered using the 3×3 mean filter template shown in FIG. 7B, and a sub-region G can be filtered using the 3×3 Gaussian filter template shown in FIG. 7A, thus achieving filtering adaptively. Apparently, the above descriptions are merely examples of regional division and filtering. Actual processing can be determined based on specific situations. For example, filtering may not be performed on the sub-region G.

In short, for the problems of a waste of an encoding bit rate and a zigzag effect of a rendered image caused by an excessive number of mapping samples of high-frequency components that are generated in regions away from a primary perspective of a user during adaptive resolution mapping and transcoding, the embodiments of the present application set up an adaptive filtering method that varies according to perspective angles of the user in secondary perspective regions that are away from the primary perspective, to smooth images that include the high-frequency components, thus reducing the intensities of the high-frequency components.

Based on the above image processing apparatus, a regional filtering of an image is used as an example for illustration.

Figure 8:
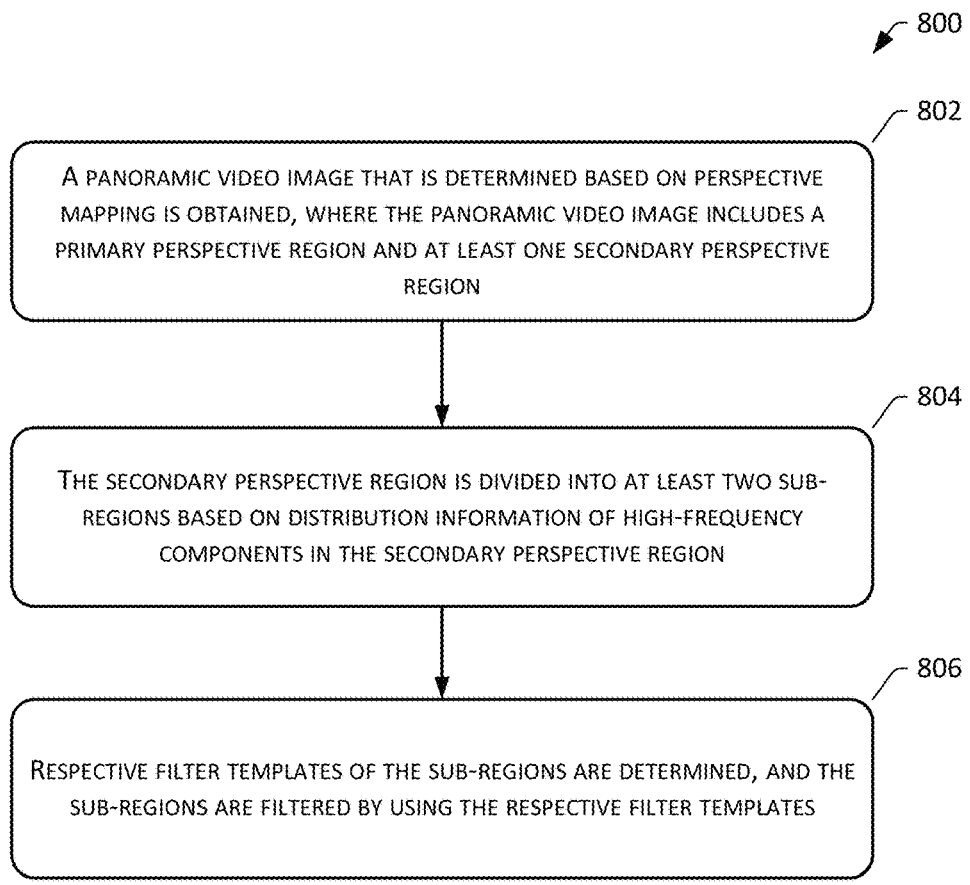
FIG. 8 is a flowchart illustrating a panoramic video image processing method according to an embodiment of the present application.

FIG. 8 shows a flowchart of an image processing method 800 according to an embodiment of the present application.

Block 802: A panoramic video image that is determined based on perspective mapping is obtained, where the panoramic video image includes a primary perspective region and at least one secondary perspective region.

Block 804: The secondary perspective region is divided into at least two sub-regions based on distribution information of high-frequency components in the secondary perspective region.

Block 806: Respective filter templates of the sub-regions are determined, and the sub-regions are filtered by using the respective filter templates.

The apparatus creates a three-dimensional mapping model based on a perspective mapping, where the perspective can refer to an angle formed between a line of sight and a vertical direction of a display device such as a display. The three-dimensional mapping model is used to perform image mapping and two-dimensional expanding to obtain a panoramic video image. In other words, the panoramic video image is determined based on the perspective mapping, and therefore the panoramic video image includes a primary perspective region and at least one secondary perspective region. Each secondary perspective region can be divided into at least two sub-regions based on high-frequency components of the secondary perspective region, e.g., according to the number of high-frequency components in the region, in which the number of the high-frequency components in one sub-region is greater than that of the other sub-region. Due to differences in respective numbers of high-frequency components, the two sub-regions need to be filtered using different filter templates. A filter template for each sub-region can be determined, and smoothing filtering processing can be performed on corresponding sub-regions using respective filter templates. High-frequency components in the regions can be effectively smoothed through smoothing filtering to obtain a filtered panoramic video image. The filtered panoramic video image can then be encoded and compressed, and the encoded and compressed image is then transmitted to a user end.

In short, a panoramic video image including a primary perspective region and at least one secondary perspective region is obtained. The secondary perspective region is then divided into at least two sub-regions based on high-frequency components in the secondary perspective region. A regional processing is performed based on the high-frequency components. In other words, a filter template for each sub-region is determined, and the sub-regions are filtered using respective filter templates. Corresponding filtering is performed based on high-frequency components in different sub-regions, to smooth the high-frequency components in the corresponding sub-regions, thus preventing a zigzag effect during rendering at a user side, and improving the visual experience of users.

The embodiments of the present application can be applied to various types of perspective-based model construction, mapping and expansion. An approach of Pyramid mapping and expanding is used as an example to describe processing on a panoramic video image after mapping and expansion. The approach of Pyramid mapping and expansion uses different images mapped from different primary perspectives that are viewed by a user. In other words, each channel of a mapped image has the clearest resolution at a certain primary perspective of the user, and a mapping resolution decreases at positions away from the primary perspective of the user. Therefore, the approach of Pyramid mapping and expansion can obtain a mapped and expanded image with a lower resolution on each channel of mapped image. FIG. 4 is a schematic diagram of principles of Pyramid mapping. A Pyramid mapping model has a high resolution in a portion with respect to a primary perspective of a user, and a mapping resolution gradually decreases at regions away from the primary perspective of the user. A vertex of a rectangular pyramid in the Pyramid mapping model represents a position that is farthest away from a viewing perspective of the user. FIG. 6 shows a panoramic video image after mapping and expansion using a Pyramid mapping model.

Although a Pyramid model can greatly reduce a resolution of a mapped image, the following problems in regions that are away from a primary perspective of the user occur because the resolution of the mapped image gradually decreases away from the primary perspective of the user. First, during a process of final rendering, sampling regions of high-frequency image mapping that are far away from the primary perspective of the user will cause a severe zigzag rendering effect. Second, an increase in the number of high-frequency components of the image will result in an increase in a bit rate required by compression, and a large portion of an encoding bit rate is consumed at high-frequency image regions that are far away from the primary perspective of the user, thus degrading the encoding quality of a primary perspective region and affecting the sharpness of the primary perspective region. Therefore, the embodiments of the present application can use an adaptive filtering to solve the problems of panoramic video transcoding technologies for Pyramid models and other adaptive resolution mapping having similar design ideas.

An adaptive filtering in the embodiments of the present application can perform different filtering processing regionally. Dividing the secondary perspective region into the at least two sub-regions based on the high-frequency components of the secondary perspective region may include determining distribution information of the high-frequency components in the secondary perspective region, and dividing the secondary perspective region into the at least two sub-regions based on the distribution information. In other words, if mapping resolutions of regions that are away from the primary perspective of the user are gradually reduced during mapping, the high-frequency components in the secondary perspective region are not evenly distributed. Therefore, the distribution information of the high-frequency components in the secondary perspective region can be determined, and the secondary perspective region can be divided into at least two sub-regions based on the distribution information, so that different filtering processing can be performed on different sub-regions. In actual processing, the secondary perspective region can be divided into sub-regions based on the distribution information according to the number of high-frequency components, a certain angle, or side(s) of the region, etc.

Figure 9:
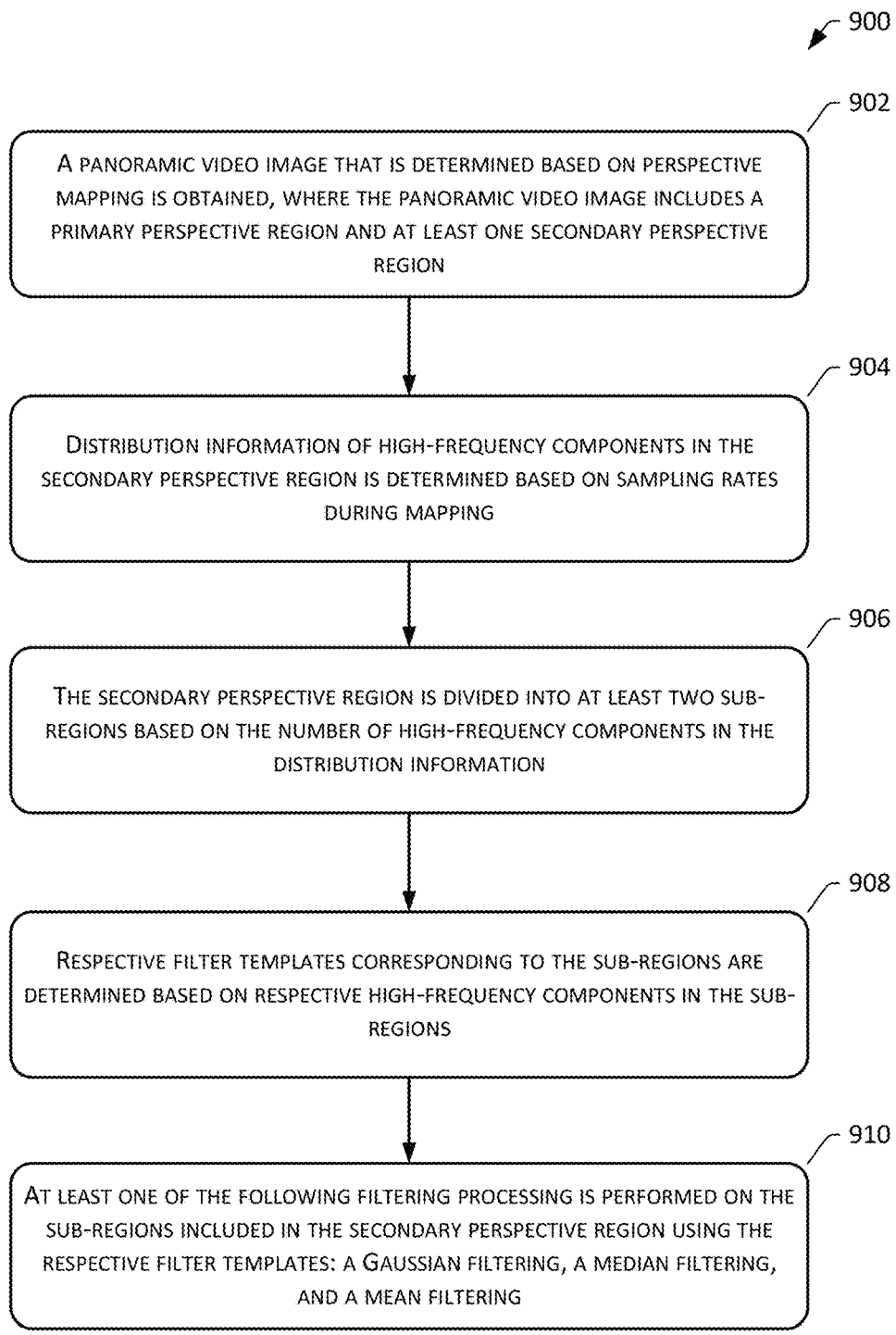
FIG. 9 is a flowchart illustrating an image processing method according to another embodiment of the present application.

FIG. 9 is a flowchart of an image processing method 900 according to another embodiment of the present application.

Block 902: A panoramic video image that is determined based on perspective mapping is obtained, where the panoramic video image includes a primary perspective region and at least one secondary perspective region.

In an example, the apparatus obtains a panoramic video image that is determined based on a perspective mapping, and determines a primary perspective region and a secondary perspective region in the panoramic video image. FIG. 6 shows an example of another panoramic video image after Pyramid mapping and two-dimensional expansion, which includes a primary perspective region 11 and secondary perspective regions 21-51. A common vertex of the secondary perspective regions can be a vertex where a region in which the highest high-frequency component is located. Therefore, an example of this type of expansion can also combine the four secondary perspective regions into a single secondary perspective region.

Block 904: Distribution information of high-frequency components in the secondary perspective region is determined based on sampling rates during mapping.

During adaptive mapping, mapping sampling is gradually enhanced as a distance from the primary perspective of the user is increased. Therefore, the apparatus can determine the distribution information of the high-frequency components in the secondary perspective region based on sampling rates during the mapping. In other words, the number of high-frequency components is higher in a region further away from a position of the primary perspective within the secondary perspective region. In contrast, the number of high-frequency components is lower in a region closer to the position of the primary perspective within the secondary perspective region.

Block 906: The secondary perspective region is divided into at least two sub-regions based on the number of high-frequency components in the distribution information.

After the distribution information of the high-frequency components in the secondary perspective region is determined, the apparatus can be configured to determine the number of high-frequency components in each positional region of the secondary perspective region based on the distribution information, and divide the secondary perspective region into at least two sub-regions based on the number of high-frequency components. For example, one or more thresholds can be set up, and a division into two or more sub-regions can be obtained based on a comparison between the thresholds and the number of high-frequency components in the region. As shown in FIG. 6, the secondary perspective region can be divided into three sub-regions E, F, and G based on the number of high-frequency components in the secondary perspective region that is determined according to the distribution information, i.e., a distance from the primary perspective of the user. E is a sub-region that is farthest away from the primary perspective of the user, and G is a sub-region that is closest to the primary perspective of the user. For example, the number of high-frequency components can be set to N according to a manner of comparing the thresholds and the number, and the thresholds include T1 and T2, with T1>T2. As such, a sub-region where N>T1 is E, a sub-region where T1≥N>T2 is F, and a sub-region where N≥T2 is G.

Block 908: Respective filter templates corresponding to the sub-regions are determined based on respective high-frequency components in the sub-regions.

Block 910: At least one of the following filtering processing is performed on the sub-regions included in the secondary perspective region using the respective filter templates: a Gaussian filtering, a median filtering, and a mean filtering.

The sub-regions are obtained by division according to the number of high-frequency components. Correspondingly, different smoothing filtering processing needs to be performed on different sub-regions based on respective numbers of high-frequency components. Respective filter templates corresponding to the sub-regions can be determined based on the high-frequency components in the sub-region. The larger the number of high-frequency components is, the greater the degree of smoothness of a filter template is. A degree of smoothness of a filter template is determined based on the size and the strength of the filter template, and the strength is determined based on a coefficient of the filter template. In other words, a sub-region having a larger number of high-frequency components uses a filter (i.e., a filter template) having a larger template size and a higher strength, thus achieving an effect of smoothing high-frequency components. When the sizes of two filter templates are the same, respective degrees of smoothness are determined based on respective coefficients of the filter templates.

After the respective filter templates of the sub-regions are determined, the apparatus filters the sub-regions based on the respective filter templates, where the smoothing filtering includes at least one of the following: a Gaussian filtering, a median filtering, and a mean filtering. Other low-pass filter templates such as linear or non-linear smoothing filtering methods, may also be used, which are not exhaustively listed in the present embodiment, and should not be construed as a limitation to the present application. Therefore, the filter templates can be used to perform at least one of the following filtering processing on the sub-regions obtained by dividing the secondary perspective region: a Gaussian filtering, a median filtering, and a mean filtering. Specifically, for the sub-regions that are obtained by dividing the secondary perspective region, different smoothing filtering processing can be performed by using templates having a same size based on respectively high-frequency components that are included. Alternatively, same or different smoothing filtering processing can be performed by using templates having different sizes. A filtered panoramic video image can be obtained by filtering. A corresponding category of filtering processing can be determined based on a coefficient of a filter template.

For example, the sub-regions of FIG. 6 can be filtered using three different filter templates as shown in FIG. 7. FIG. 7A shows a 3×3 Gaussian filter template. FIG. 7B shows a 3×3 mean filter template. FIG. 7C shows a 5×5 mean filter template. Among the three templates, the mean filter template shown in FIG. 7C has the largest degree of smoothness, and the mean filter template shown in FIG. 7A has the smallest degree of smoothness. Therefore, a sub-region E can be filtered using the 5×5 mean filter template shown in FIG. 7C, a sub-region F can be filtered using the 3×3 mean filter template shown in FIG. 7B, and a sub-region G can be filtered using the 3×3 Gaussian filter template shown in FIG. 7A, thus achieving filtering adaptively. Apparently, the above descriptions are merely examples of regional division and filtering. Actual processing can be determined based on specific situations. For example, filtering may not be performed on the sub-region G.

Figure 10:
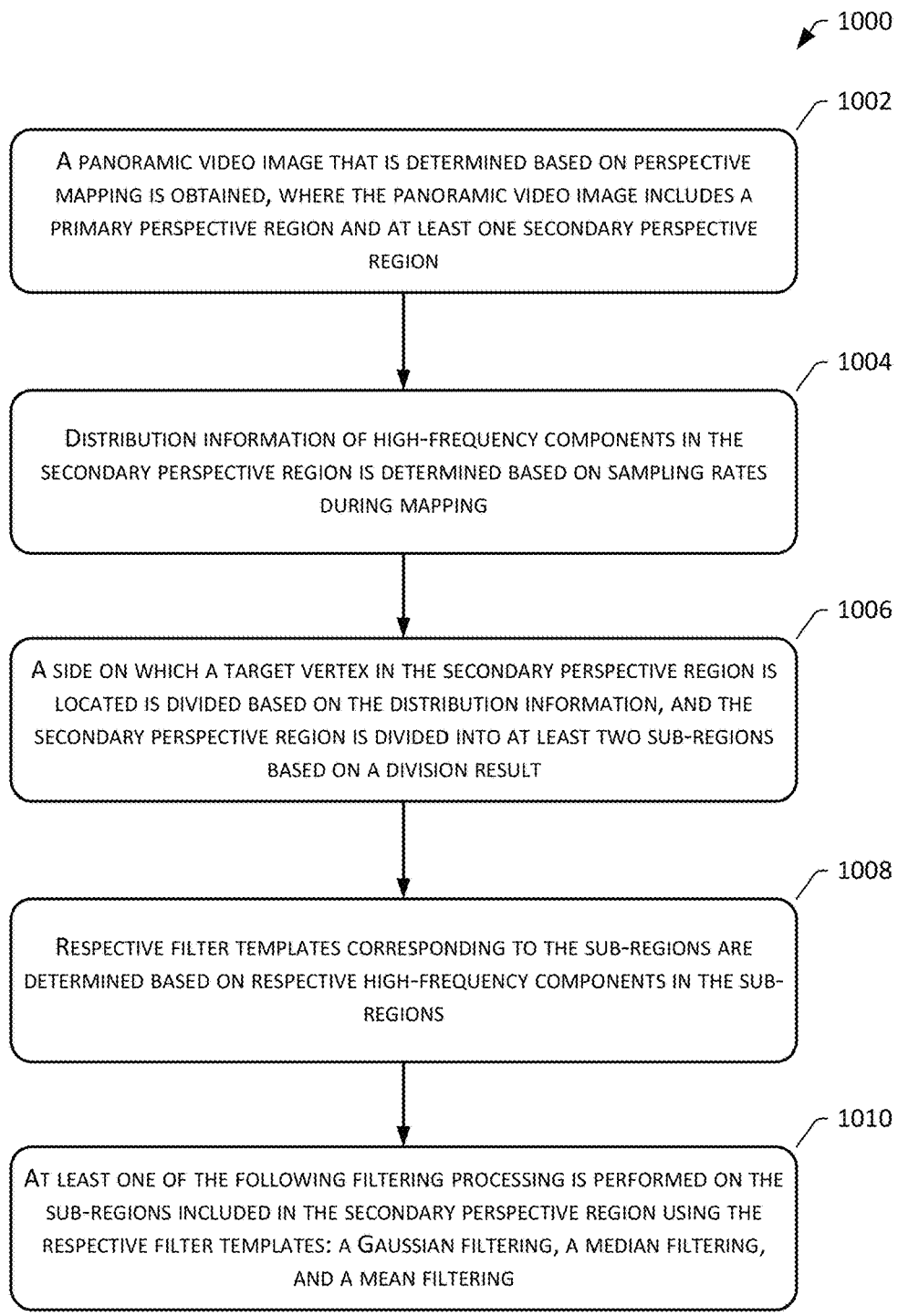
FIG. 10 is a flowchart of another image processing method according to another embodiment of the present application.

FIG. 10 is a flowchart of another image processing method 1000 according to another embodiment of the present application.

Block 1002: A panoramic video image that is determined based on perspective mapping is obtained, where the panoramic video image includes a primary perspective region and at least one secondary perspective region.

In another example, the apparatus obtains a panoramic video image determined based on a perspective mapping, and determines a primary perspective region and secondary perspective regions in the panoramic video image. FIG. 2 shows an example of a panoramic video image obtained after Pyramid mapping and two-dimensional expansion, which includes a primary perspective region 10, and secondary perspective regions 20-50.

Block 1004: Distribution information of high-frequency components in the secondary perspective region is determined based on sampling rates during mapping.

Block 1006: A side on which a target vertex in the secondary perspective region is located is divided based on the distribution information, and the secondary perspective region is divided into at least two sub-regions based on a division result.

A target vertex includes a vertex where a region having the highest high-frequency component is located. For example, a vertex in the four secondary perspective regions in FIG. 2 that does not overlap with the primary perspective region is the vertex where the region having the highest high-frequency component is located. After the distribution information of the high-frequency components in the secondary perspective region is determined, a regional division can be carried performed based on the distribution information according to a certain angle or according to a side of the secondary perspective region. A resolution (i.e., the high-frequency components) in the secondary perspective region generally changes continuously and gradually. For example, the resolution in FIG. 2 decreases along a 45-degree direction, and therefore, the secondary perspective region can be divided into sub-regions based on the 45-degree direction. Alternatively, a side where the target vertex is located is divided based on a certain rule. A parallel line is made from an intersection obtained by division to an opposite side of the target vertex, and at least two sub-regions are determined based on the focus and the parallel line.

Block 1008: Respective filter templates corresponding to the sub-regions are determined based on respective high-frequency components in the sub-regions.

Block 1010: At least one of the following filtering processing is performed on the sub-regions included in the secondary perspective region using the respective filter templates: a Gaussian filtering, a median filtering, and a mean filtering.

For example, besides the foregoing filtering approaches, filtering can be performed on the sub-regions of FIG. 2 using three different filter templates as shown in FIG. 7. A sub-region A can be filtered using a 5×5 mean filter template as shown in FIG. 7C, a sub-region B can be filtered using a 3×3 mean filter template as shown in FIG. 7B, a sub-region C can be filtered by using a 3×3 Gaussian filter template as shown in FIG. 7A, and filtering may not be performed on a sub-region D, thus performing an adaptive filtering processing on the secondary perspective region.

In short, for the problems of a waste of an encoding bit rate and a zigzag effect of a rendered image caused by an excessive number of mapping samples of high-frequency components that are generated in regions away from a primary perspective of a user during adaptive resolution mapping and transcoding, the embodiments of the present application set up an adaptive filtering method that varies according to perspective angles of the user in secondary perspective regions that are away from the primary perspective, to smooth images that include the high-frequency components, thus reducing the intensities of the high-frequency components.

First, a regional division, a template selection, etc., during an adaptive filtering are not unique, and regional processing can be performed using corresponding adaptive filters based on how far a secondary perspective region is away from a primary perspective of a user (corresponding to a degree of severity of image high-frequency components caused by mapping sampling). Next, template sizes and strengths of the adaptive filters are also designed flexibly for different regions (e.g., various filter templates as shown in FIG. 7). Furthermore, regional division for filtering can be designed adaptively according to features of mapping sampling high-frequency components caused by an actual adaptive mapping transcoding algorithm (which is Pyramid or other approaches), and sizes and shapes of regions can be determined flexibly according to actual situations.

Sizes and strengths of filter templates designed based on a distance of a secondary perspective region from a primary perspective of the user are not the same. An adaptive filtering method generally needs to be designed in consideration of the following two major principles. First, an adaptive filtering needs to adapt to an impact of high-frequency components caused by mapping sampling that is gradually enhanced in a direction away from a primary perspective of a user, and more mapping sampling of high-frequency components exist at a position much further away from the primary perspective of the user, and adaptive filtering needs to be stronger correspondingly. This can be implemented by using a larger size and a smoother coefficient of a template. Second, the design of the adaptive filtering algorithm needs to consider the transition of smoothness. A filter template selected for a sub-region needs to transition smoothly corresponding to the strength of filtering, to prevent a user from experiencing an increase in image blurring caused by a sudden change in filtering. For example, sizes and coefficients of the filter templates in FIG. 7 all transition smoothly.

The above embodiments are all used as examples for describing an adaptive filtering processing for a panoramic video image. During actual processing, adjustments can be made adaptively as needed in aspects including a number of filtering regions, a range of a filtering region, a strength and a size of a filter template, etc. Therefore, an encoding bit rate can thereby be concentrated towards a primary perspective of a user based on the above adaptive filtering processing. A viewing resolution of the primary perspective of the user is improved, and zigzag effects of regions that are away from the primary perspective of the user can be alleviated, thus improving the visual experience when the user suddenly switches the perspective to a position that is away from the primary perspective.

In the embodiments of the present application, the user terminal refers to a terminal device having multimedia functionalities. These devices support functions in terms of audio, video, data, etc. In the present embodiment, the user terminal can include a smart mobile terminal such as a smart phone, a tablet computer, a smart wearable device, a VR device, etc. After obtaining a filtered image, a device, such as a server, can encode the filtered image and then send the encoded image to the user terminal, to enable a user to view a panoramic video on the user terminal.

It should be noted that the method embodiments are described as a series of combinations of actions for the sake of description. However, one skilled in the art should know that the embodiments of the present application are not limited to orders of actions described herein, because some operations may be performed in other orders or in parallel according to the embodiments of the present application. Furthermore, one skilled in the art should also know that the embodiments described in the specification are all preferred embodiments, and actions involved therein may not be necessary for the embodiments of the present application.

Figure 11:
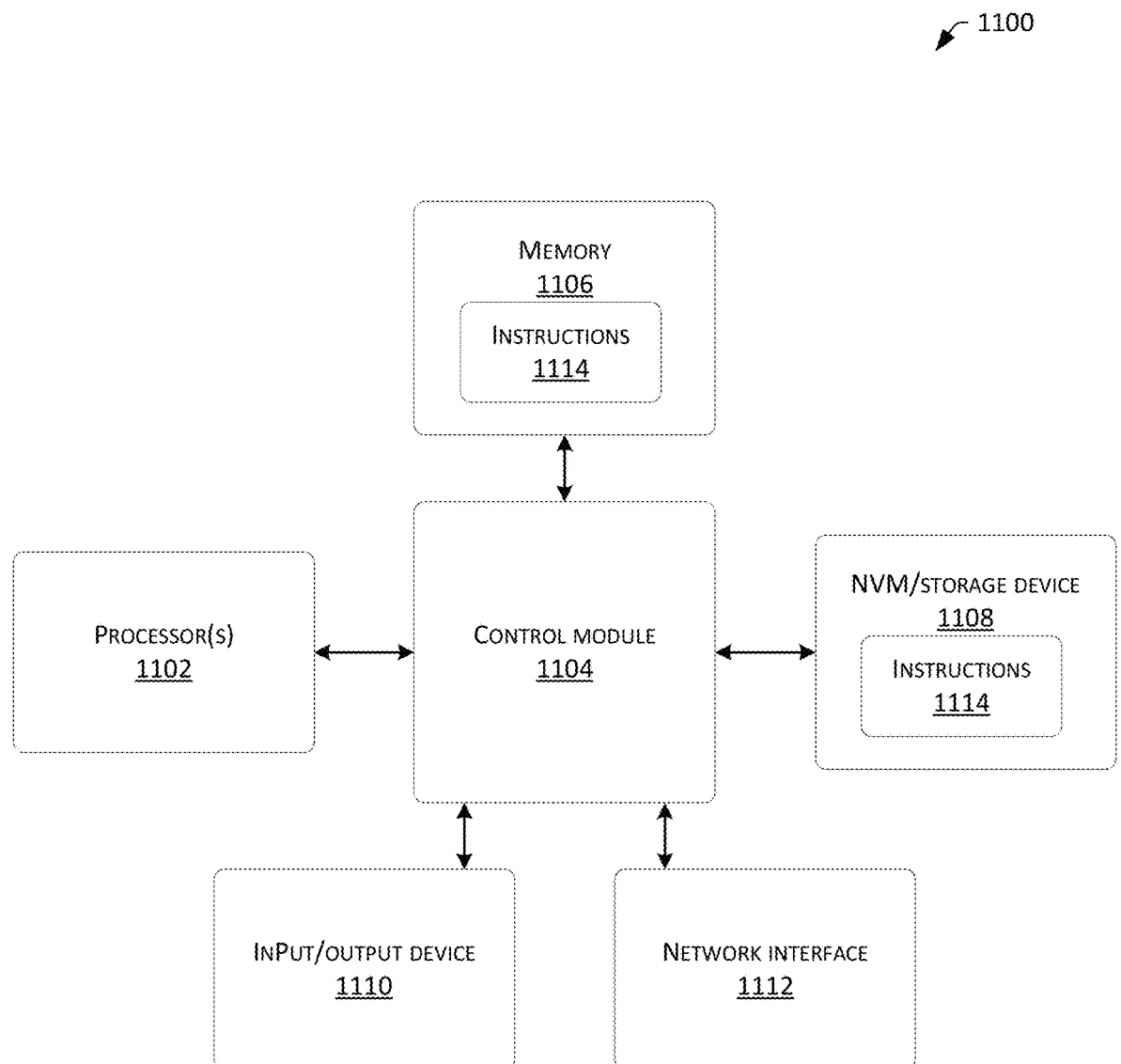
FIG. 11 is a schematic structural diagram of an apparatus according to an embodiment of the present application.

The embodiments of the present disclosure can be implemented as an apparatus that performs desired configurations using any suitable hardware components and/or software components. FIG. 11 schematically shows an exemplary apparatus 1100 that can be used to implement various embodiments of the present application, such as the apparatus 300 as shown in FIGS. 3 and 5, for example.

In an embodiment, FIG. 11 shows an exemplary apparatus 1100. The apparatus includes one or more processors 1102, at least one control module (a chipset) 1104 coupled to the (one or more) processors 1102, memory 1106 coupled to the control module 1104, a non-volatile memory (NVM)/storage device 1108 coupled to the control module 1104, one or more input/output devices 1110 coupled to the control module 104, and a network interface 1112 coupled to the control module 106.

The processor 1102 can include one or more single-core or multi-core processors. The processor 1102 can include any combination of general-purpose processor(s) or dedicated processor(s) (such as a graphics processor, an application processor, and a baseband processor). In some embodiments, the apparatus 1100 can be used as the device described in the embodiments of the present application, such as the server at the transcoding end.

In some embodiments, the apparatus 1100 can include one or more computer-readable media (e.g., the memory 1106 or NVM/storage device 108) storing instructions 1114, and one or more processors 1102 that are coupled to the one or more computer-readable media and are configured to execute the instructions 1114 to implement modules to perform actions described in the present disclosure. The memory 1106 is an example of a computer-readable media.

The computer-readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In an embodiment, the control module 1104 can include any suitable interface controller, to provide any suitable interface for at least one of the (one or more) processors 1102 and/or any suitable device or component that communicates with the control module 1104.

The control module 1104 can include a memory control module, to provide an interface for the memory 1106. The memory controller module can be a hardware module, a software module and/or a firmware module.

The memory 1106 can be configured to load and store data and/or the instructions 1114 for the apparatus 1100, for example. In an embodiment, the memory 1106 can include any suitable volatile memory, for example, a suitable DRAM. In some embodiments, the memory 106 can include a double data rate 4 synchronous dynamic random access memory (DDR4SDRAM).

In an embodiment, the control module 1104 can include one or more input/output controllers, to provide interfaces for the NVM/storage device 1108 and the (one or more) input/output devices 1110.

For example, the NVM/storage device 1108 can be configured to store data and/or the instructions 1114. The NVM/storage device 1108 can include any suitable non-volatile memory (e.g., a flash memory) and/or can include any suitable (one or more) non-volatile storage devices (e.g., one or more hard disk drives (HDD), one or more compact disc (CD) drives and/or one or more digital versatile disc (DVD) drives).

The NVM/storage device 1108 can include a part of storage resources of a device to which the NVM/storage device 1108 is mounted physically as the apparatus 1100, or can be accessed by the device without being a part of the device. For example, the NVM/storage device 1108 can be accessed by (one or more) input/output devices 1110 over a network.

The (one or more) input/output devices 1110 can provide interfaces for the apparatus 1100 to communicate with any other suitable device. The input/output device 1110 can include a communication component, an audio component, a sensor component, and the like. The network interface 1112 can provide an interface for the apparatus 1100 to communicate over one or more networks. The apparatus 1100 can communicate wirelessly with one or more components of the wireless network according to any of one or more wireless network standards and/or protocols, for example, conduct wireless communication by accessing a communication standard-based wireless network, such as WiFi, 2G, 3G, or a combination thereof.

In an embodiment, at least one of the (one or more) processors 1102 can be packaged with logic of one or more controllers (e.g., the memory controller module) of the control module 1104. In an embodiment, at least one of the (one or more) processors 1102 can be packaged with the logic of one or more controllers of the control module 104 to form a system in package (SiP). In an embodiment, at least one of the (one or more) processors 102 can be integrated with the logic of one or more controllers of the control module 1104 onto a same die. In an embodiment, at least one of the (one or more) processors 1102 can be integrated with the logic of one or more controllers of the control module 1104 onto a same die to form a system on chip (SoC).

In various embodiments, the apparatus 1100 may be, but is not limited to a server, a desktop computing device, a mobile computing device (such as a laptop computing device, a handheld computing device, a tablet computer, or a netbook), and other terminal devices. In various embodiments, the apparatus 1100 can have more or fewer components and/or different architectures. For example, in some embodiments, the apparatus 100 includes one or more cameras, a keyboard, a liquid crystal display (LCD) screen (including a touch screen display), a non-volatile memory port, multiple antennas, a graphics chip, an application-specific integrated circuit (ASIC), and a speaker.

The embodiments of the present application disclose a method and an apparatus. Example 1 includes an image processing method, which includes obtaining a panoramic video image, where the panoramic video image is determined based on a perspective mapping, and the panoramic video image includes a primary perspective region and at least one secondary perspective region; dividing the secondary perspective region into at least two sub-regions based on distribution information of high-frequency components in the secondary perspective region; determining respective filter templates of the sub-regions, and filtering the sub-regions using the respective filter templates; and determining a filtered panoramic video image.

Example 2 includes the method of Example 1, and further includes determining the distribution information of the high-frequency components in the secondary perspective region based on sampling rates during mapping.

Example 3 includes the method described in Example 1 and/or Example 2, where dividing the secondary perspective region into the at least two sub-regions based on the distribution information of the high-frequency components in the secondary perspective region includes dividing the secondary perspective region into the at least two sub-regions based on the number of high-frequency components in the distribution information.

Example 4 includes the method described in one or more of Example 1-Example 3, where dividing the secondary perspective region into the at least two sub-regions based on the distribution information of the high-frequency components in the secondary perspective region includes dividing a side on which a target vertex in the secondary perspective region is located based on the distribution information, and dividing the secondary perspective region into the at least two sub-regions based on a division result, wherein the target vertex includes a vertex where a region having the highest high-frequency component is located.

Example 5 includes the method described in one or more of Example 1-Example 4, wherein determining the respective filter templates of the sub-regions includes: determining the respective filter templates corresponding to the sub-regions based on respective high-frequency components in the sub-regions, wherein a larger number of high-frequency components result in a greater smoothness of a filter template.

Example 6 includes the method described in one or more of Example 1-Example 5, wherein a degree of smoothness of a filter template is determined based on a size and a strength of the filter template, and the strength is determined based on a coefficient of the filter template, and the degree of smoothness is determined based on the coefficient of the filter template when sizes of two filter templates are the same.

Example 7 includes the method described in one or more of Example 1-Example 6, wherein the respective filter templates are used to perform at least one of the following filtering processing on the sub-regions: a Gaussian filtering, a median filtering, a mean filtering, and another low-pass filtering.

Example 8 includes an image processing apparatus, which includes an acquisition module configured to obtain a panoramic video image, wherein the panoramic video image is determined based on a perspective mapping, and the panoramic video image includes a primary perspective region and at least one secondary perspective region; a division module configured to divide the secondary perspective region into at least two sub-regions based on distribution information of high-frequency components in the secondary perspective region; and a filtering module configured to determine respective filter templates of the sub-regions, and filter the sub-regions using the respective filter templates; and determine a filtered panoramic video image.

Example 9 includes the apparatus of Example 8, where the division module is further configured to determine the distribution information of the high-frequency components in the secondary perspective region based on sampling rates during mapping.

Example 10 includes the apparatus described in Example 8 and/or Example 9, wherein the division module includes a number division sub-module configured to divide the secondary perspective region into the at least two sub-regions based on the number of high-frequency components in the distribution information.

Example 11 includes the apparatus described in one or more of Example 8-Example 10, where the division module includes a vertex division sub-module configured to divide a side on which a target vertex in the secondary perspective region is located based on the distribution information, and divide the secondary perspective region into the at least two sub-regions based on a division result, where the target vertex includes a vertex where a region having the highest high-frequency component is located.

Example 12 includes the apparatus described in one or more of Example 8-Example 11, where the filtering module includes a template determination sub-module configured to determine the respective filter templates corresponding to the sub-regions based on respective high-frequency components in the sub-regions, where a larger number of high-frequency components result in a greater degree of smoothness of a filter template, the degree of smoothness of the filter template is determined based on a size and a strength of the filter template, the strength is determined based on a coefficient of the filter template, and the degree of smoothness is determined based on the coefficient of the filter template when sizes of two filter templates are the same.

Example 13 includes the apparatus described in one or more of Example 8-Example 12, where the filtering module includes a filtering processing sub-module configured to use the respective filter templates to perform at least one of the following filtering processing on the sub-regions: a Gaussian filtering, a median filtering, and a mean filtering.

Example 14 includes an apparatus, including: one or more processors; and one or more machine-readable media storing instructions that, when executed by the one or more processors, cause the apparatus to execute the method of one or more of Examples 1-7.

Example 15 includes one or more machine-readable media storing instructions that, when executed by one or more processors, cause an apparatus to execute the method of one or more of Examples 1-7.

Although some embodiments are illustrative and descriptive, a variety of different types of replacements and/or equivalents of solutions or computations can be used to achieve implementations that are shown and described by embodiments of the same objectives, without departing from the scope of implementations of the present application. The present application is intended to cover any modifications or changes made to the embodiments discussed in the present specification. Therefore, it is apparent that the embodiments described in the present specification are defined only by claims and their equivalents.

The invention claimed is:

1. A method comprising: obtaining a panoramic video image, wherein the panoramic video image is determined based on a perspective mapping, and the panoramic video image comprises a primary perspective region and at least one secondary perspective region, wherein the primary perspective region and the at least one secondary perspective region do not overlap; dividing the secondary perspective region into at least two sub-regions based on distribution information of high-frequency components in the secondary perspective region; and determining respective filter templates of respective sub-regions, and filtering the respective sub-regions using the respective filter templates.

2. The method of claim 1, further comprising:
determining the distribution information of the high-frequency components in the secondary perspective region based on a sampling rate during mapping.

3. The method of claim 1, wherein the distribution information comprises a number of the high-frequency components.

4. The method of claim 1, wherein dividing the secondary perspective region into the at least two sub-regions based on the distribution information of the high-frequency components in the secondary perspective region comprises dividing a side on which a target vertex in the secondary perspective region is located based on the distribution information, and dividing the secondary perspective region into the at least two sub-regions based on a division result, wherein the target vertex comprises a vertex where a region having a highest high-frequency component is located.

5. The method of claim 1, wherein determining the respective filter templates of the respective sub-regions comprises determining the respective filter templates corresponding to the respective sub-regions based on respective high-frequency components in the respective sub-regions, wherein a larger number of high-frequency components result in a greater degree of smoothness of a filter template.

6. The method of claim 5, wherein the degree of smoothness of the filter template is determined based on a size and a strength of the filter template, the strength is determined based on a coefficient of the filter template, and the degree of smoothness is determined based on the coefficient of the filter template when sizes of two filter templates are identical.

7. The method of claim 1, wherein the respective filter templates are used to perform at least one of the following filtering processing on the respective sub-regions: a Gaussian filtering, a median filtering, a mean filtering, and another low-pass filtering.

8. An apparatus comprising: one or more processors; memory; an acquisition module stored in the memory and executable by the one or more processors to obtain a panoramic video image, wherein the panoramic video image is determined based on a perspective mapping, and the panoramic video image comprises a primary perspective region and at least one secondary perspective region, wherein the primary perspective region and the at least one secondary perspective region do not overlap; a division module stored in the memory and executable by the one or more processors to divide the secondary perspective region into at least two sub-regions based on distribution information of high-frequency components in the secondary perspective region; and a filtering module stored in the memory and executable by the one or more processors to determine respective filter templates of respective sub-regions, and filter the respective sub-regions using the respective filter templates.

9. The apparatus of claim 8, wherein the division module is further configured to determine the distribution information of the high-frequency components in the secondary perspective region based on a sampling rate during mapping.

10. The apparatus of claim 8, wherein the distribution information comprises a number of the high-frequency components.

11. The apparatus of claim 8, wherein the division module comprises a vertex division sub-module configured to divide a side on which a target vertex in the secondary perspective region is located based on the distribution information, and divide the secondary perspective region into the at least two sub-regions based on a division result, wherein the target vertex comprises a vertex where a region having a highest high-frequency component is located.

12. The apparatus of claim 8, wherein the filtering module comprises a template determination sub-module configured to determine the respective filter templates corresponding to the respective sub-regions based on respective high-frequency components in the respective sub-regions, wherein a larger number of high-frequency components result in a greater degree of smoothness of a filter template, the degree of smoothness of the filter template is determined based on a size and a strength of the filter template, the strength is determined based on a coefficient of the filter template, and the degree of smoothness is determined based on the coefficient of the filter template when sizes of two filter templates are identical.

13. The apparatus of claim 8, wherein the filtering module comprises a filtering processing sub-module configured to use the respective filter templates to perform at least one of the following filtering processing on the respective sub-regions: a Gaussian filtering, a median filtering, and a mean filtering.

14. One or more computer-readable media storing executable instructions that, when executed by one or more processors, cause the one or more processors to perform acts comprising: obtaining a panoramic video image, wherein the panoramic video image is determined based on a perspective mapping, and the panoramic video image comprises a primary perspective region and at least one secondary perspective region, wherein the primary perspective region and the at least one secondary perspective region do not overlap; dividing the secondary perspective region into at least two sub-regions based on distribution information of high-frequency components in the secondary perspective region; and determining respective filter templates of respective sub-regions, and filtering the respective sub-regions using the respective filter templates.

15. The one or more computer-readable media of claim 14, the acts further comprising:
determining the distribution information of the high-frequency components in the secondary perspective region based on a sampling rate during mapping.

16. The one or more computer-readable media of claim 14, wherein the distribution information comprises a number of the high-frequency components.

17. The one or more computer-readable media of claim 14, wherein dividing the secondary perspective region into the at least two sub-regions based on the distribution information of the high-frequency components in the secondary perspective region comprises dividing a side on which a target vertex in the secondary perspective region is located based on the distribution information, and dividing the secondary perspective region into the at least two sub-regions based on a division result, wherein the target vertex comprises a vertex where a region having a highest high-frequency component is located.

18. The one or more computer-readable media of claim 14, wherein determining the respective filter templates of the respective sub-regions comprises determining the respective filter templates corresponding to the respective sub-regions based on respective high-frequency components in the respective sub-regions, wherein a larger number of high-frequency components result in a greater degree of smoothness of a filter template.

19. The one or more computer-readable media of claim 18, wherein the degree of smoothness of the filter template is determined based on a size and a strength of the filter template, the strength is determined based on a coefficient of the filter template, and the degree of smoothness is determined based on the coefficient of the filter template when sizes of two filter templates are identical.

20. The one or more computer-readable media of claim 14, wherein the respective filter templates are used to perform at least one of the following filtering processing on the respective sub-regions: a Gaussian filtering, a median filtering, a mean filtering, and another low-pass filtering.

* * * * *